(12) United States Patent
Liu et al.

(10) Patent No.: US 12,194,672 B2
(45) Date of Patent: Jan. 14, 2025

(54) DIRECT INK WRITING THREE-DIMENSIONAL PRINTING METHOD BASED ON NEAR-INFRARED PHOTOPOLYMERIZATION

(71) Applicant: JIANGNAN UNIVERSITY, Jiangsu (CN)

(72) Inventors: Ren Liu, Jiangsu (CN); Yu Liu, Jiangsu (CN); Junzhe Zhu, Jiangsu (CN)

(73) Assignee: JIANGNAN UNIVERSITY, Jiangsu (CN)

( * ) Notice: Subject to any disclaimer, the term of this patent is extended or adjusted under 35 U.S.C. 154(b) by 2 days.

(21) Appl. No.: 17/603,676

(22) PCT Filed: Jul. 9, 2020

(86) PCT No.: PCT/CN2020/101049
§ 371 (c)(1),
(2) Date: Oct. 14, 2021

(87) PCT Pub. No.: WO2021/232557
PCT Pub. Date: Nov. 25, 2021

(65) Prior Publication Data
US 2023/0043266 A1    Feb. 9, 2023

(30) Foreign Application Priority Data

May 19, 2020 (CN) .......................... 202010424765.3

(51) Int. Cl.
*B29C 64/129* (2017.01)
*B29C 64/106* (2017.01)
(Continued)

(52) U.S. Cl.
CPC .......... *B29C 64/106* (2017.08); *B29C 64/129* (2017.08); *B29C 64/209* (2017.08);
(Continued)

(58) Field of Classification Search
None
See application file for complete search history.

(56) References Cited

FOREIGN PATENT DOCUMENTS

| CN | 110698607 A | * | 1/2020 | ................ C08F 2/48 |
| WO | WO-2018106531 A1 | * | 6/2018 | ........... B29C 64/129 |

OTHER PUBLICATIONS

Machine Translation of CN-110539487-A (Year: 2019).*
Machine Translation of CN-110698607-A (Year: 2020).*

* cited by examiner

*Primary Examiner* — Robert J Grun
(74) *Attorney, Agent, or Firm* — HAUPTMAN HAM, LLP

(57) ABSTRACT

The invention relates to an ink based on near-infrared light polymerization. The method and technology of direct writing three-dimensional printing belong to the field of material processing technology area. The method is: direct writing nozzles move in three-dimensional space or stationery, the ink is squeezed out of the direct writing nozzle, receiving the near-infrared light irradiation, after curing, complete the three-dimensional object forming and curing. The solidifying time t does not exceed the ratio of near-infrared light diameter $d_l$ and the ink extrusion speed vi, that is, $t \leq d_l/v_i$. Since near-infrared light has a better medium mass penetration, can penetrate the structure during molding to promote both internal and external to a higher degree of curing, so as to achieve cross-scale structure 3D printing, and the method provided by the present invention accurately controls solidifying process of the ink and therefore achieve the DIW array 3D structure real-time curing.

7 Claims, 4 Drawing Sheets storage tank are fixedly connected with the controller, and the controller drives the direct writing nozzle and the ink storage tank to move or stop.

(51) Int. Cl.
*B29C 64/209* (2017.01)
*B29C 64/264* (2017.01)
*C08F 2/46* (2006.01)
*C08F 222/10* (2006.01)
*C09D 11/101* (2014.01)
*C09D 11/107* (2014.01)
*B33Y 10/00* (2015.01)
*B33Y 30/00* (2015.01)
*B33Y 70/00* (2020.01)
*B33Y 80/00* (2015.01)

(52) U.S. Cl.
CPC .............. *B29C 64/264* (2017.08); *C08F 2/46* (2013.01); *C08F 222/103* (2020.02); *C08F 222/1067* (2020.02); *C09D 11/101* (2013.01); *C09D 11/107* (2013.01); *B33Y 10/00* (2014.12); *B33Y 30/00* (2014.12); *B33Y 70/00* (2014.12); *B33Y 80/00* (2014.12)

storage tank are fixedly connected with the controller, and the controller drives the direct writing nozzle and the ink storage tank to move or stop.

DIRECT INK WRITING THREE-DIMENSIONAL PRINTING METHOD BASED ON NEAR-INFRARED PHOTOPOLYMERIZATION

RELATED APPLICATION

This is a U.S. national stage of international application No. PCT/CN2020/101049 filed on Jul. 9, 2020, which claims priority from China Patent Application No 202010424765.3 filed on May 19, 2020, the entire content of which is incorporated by reference.

TECHNICAL FIELD

The invention relates to the technical field of material processing and three-dimensional printing, in particularly to a direct ink writing three-dimensional printing based on near-infrared photopolymerization method thereof.

BACKGROUND OF THE INVENTION

The current 3D printing technology is mainly oriented to metallic, ceramic, and polymeric materials; while 3D printing of polymer materials is usually performed with assistance of heat or light. Direct Ink Writing (DIW) is often used as an implementation method for 3D printing, where thermosetting or photocurable 3D printing inks can be used to achieve additive manufacturing. It has been widely applied in microstructure molding, smart device preparation and other fields.

Currently, the inks used in DIW-based 3D printing are usually thermal curing type or ultraviolet (UV) curing type. For thermosetting inks, when forming large-diameter lines or large-volume shapes, due to the influence of the ink's own gravity, the structure is prone to defects or collapses. Therefore, thermosetting inks are limited to small-size 3D printing applications.

On the other hand, for light-curing inks, currently ultraviolet light (UV) or blue light is usually used as a light source for real-time curing with DIW. However, due to the weak penetration of these short wavelength lights, it would reach a low degree of curing of the core part, which is not conducive to mechanical performance during the printing of large-diameter feature-size lines. In addition, because the light source is difficult to cover multiple structures at the same time and fast curing, it is difficult for the ultraviolet curing type to achieve DIW array printing to improve printing efficiency.

SUMMARY OF THE INVENTION

Based on the above problems, the present invention provides a method of DIW 3D printing based on near-infrared photopolymerization. The method is as follows: the direct writing nozzle moves or stands still in a three-dimensional space, and the ink is extruded out of the direct writing nozzle. Under the irradiation of near-infrared light, the 3D printed object is solidified after photocuring, and the curing time t does not exceed the ratio of the near-infrared light diameter ($d_l$) to the ink extrusion speed ($v_i$), that is, $t \leq d_l/v_i$.

In one embodiment, the moving speed of the direct writing nozzle is 0 to 5.0 mm/s, and the diameter of the direct writing nozzle is in the range of 0.1 µm to 10 cm.

In one embodiment, the composition of the ink includes a photopolymerizable resin, a photopolymerizable monomer, a photoinitiator, an up-conversion material, a thixotropic agent, and a filler.

In one embodiment, the composition of the ink is as follows:

0-80 wt % photopolymerizable resin, 0-80 wt. % photopolymerizable monomer, 0.5-6 wt % photoinitiator, 0.5-5 wt % upconversion material, 0-30 wt. % thixotropic agent, 2-30 wt. % fillers.

In one embodiment, the rheological properties of the ink should satisfy: the elastic modulus G' is 0.5-5 times the loss modulus G", that is, $0.5G'' \leq G' \leq 5G''$.

In one embodiment, the force for ink-extruding is pressure, and the pressure does not exceed 800 kPa.

In one embodiment, the near-infrared laser is a light beam or light spot, and the light spot or light beam is located within 1 cm of the direct writing nozzle.

In one embodiment, the power of the near-infrared laser is 0-50 W, and the wavelength range is 700-2000 nm.

In one embodiment, the photopolymerizable resin includes a resin containing an acrylate double bond, a resin containing a vinyl ether double bond, a resin containing an epoxy group, and preferably a resin containing an acrylate double bond;

Photopolymerizable monomers include One or more of the following monomers-monofunctional acrylate monomers, difunctional acrylate monomers, multifunctional acrylate monomers, vinyl ether monomers, ester ring epoxy monomers, oxetane monomers.

Photoinitiators include one or more of following initiators: 2,4,6-trimethyl benzoyl diphenyl phosphine oxide; 1-hydroxycyclohexyl phenyl ketone; 2,4,6-trimethyl benzoyl phenyl phosphonic acid ethyl ester; bis 2,6-difluoro-3-pyrrole phenyl titanocene; phenyl bis (2,4,6-trimethylbenzoyl) phosphine oxide; 2-isopropylthioxanthone; 2-Hydroxy-2-methyl-1-phenylacetone: 2-methyl-2-(4-morpholinylphenyl)-1-[4-(methylthio)phenyl]-1-acetone,1,7,7'-Trimethyl-bicyclo(2,2,1)heptane-1,3-dione; tetrafluoroborate methyl diphenyl sulfonium salt 4,4'-dimethyl diphenyl iodonium salt hexafluorophosphate; ferrocene hexafluorophosphate;

Up-conversion materials include one or more of NaYF4, BaYF5, NaGdF4, LiYF4, NaYbF4, Na3ScF6, YF3, and GdOF;

Thixotropic agents include fumed silica;

The filler includes one or more of barium sulfate, titanium dioxide, silicon dioxide, and talc.

In one embodiment, the photopolymerizable resin includes epoxy acrylate, urethane acrylate, amino acrylate, polyester acrylate.

In one embodiment, the ink contains pigments.

The second object of the present invention is to provide a device for ink direct writing 3D printing based on near-infrared photopolymerization, the device comprising:

Support table, used to support the formed three-dimensional object;

The near-infrared light emitting structure is located above the support platform and is fixedly connected with the controller, and the controller drives the near-infrared light emitting structure to move or stop;

The direct writing nozzle is located above the supporting table, and the direct writing nozzle is sealed with the ink storage tank, and the direct writing nozzle and/or the ink storage tank are fixedly connected with the controller, and the controller drives the direct writing nozzle and the ink storage tank to move or stop.

The advantages of the invention are:

Since near-infrared light has good medium permeability, which could promise a good penetration in 3D printed structures during molding promotes both the inside and the outside to reach a higher degree of curing, thus 3D printing from small to large-sized structures can be realized. And the method of present invention provides precisely controls of the ink curing process, so as to realize the real-time curing of the DIW array 3D structure. In addition, due to the use of real-time curing, curing and crosslinking is realized during the ink discharge process, and the mechanical properties are improved, while the large-size structure collapse caused by insufficient storage modulus are avoided. In addition, compared with traditional UV light sources, NIR light sources have better penetrability and can fully cure the ink to obtain 3D printed objects with more predictable and relatively better mechanical properties.

DESCRIPTION OF PREFERRED EMBODIMENTS

Example 1

Figure 1:
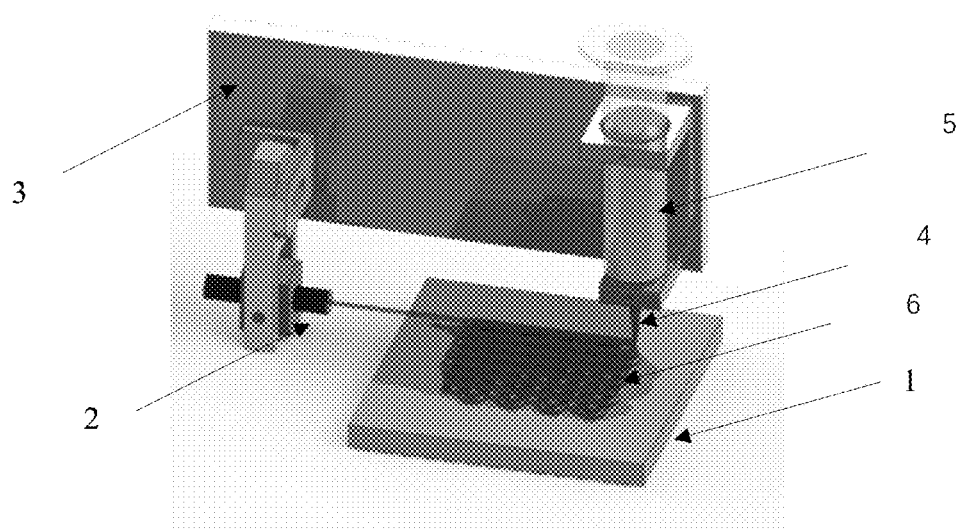
FIG. 1 is a device for DIW 3D printing based on near-infrared photopolymerization, in which 1 is a support table; 2 is a near-infrared light emitting structure; 3 is a controller; 4 is a direct writing nozzle; 5 is an ink storage tank; 6 The printed three-dimensional object.

FIG. 1 is a near-infrared light polymerized DIW 3D printing device, which is composed of a support table 1, a near-infrared light emitting structure 2, a controller 3, a direct writing nozzle 4, and an ink storage tank 5.

The support table 1 is used to support three-dimensional objects 6; the near-infrared light emitting structure 2 is located above the support table 1, and is fixedly connected to the controller 3. The controller 3 drives the near-infrared light emitting structure 2 to move or stand still; the direct writing nozzle 4 is located Above the supporting table 1, the direct writing nozzle 4 and the ink storage tank 5 are hermetically connected, the direct writing nozzle 4 and the ink storage tank 5 are fixedly connected with the controller 3, and the controller 3 drives the direct writing nozzle 4 and the ink storage tank 5 to move or stop.

Figure 2:
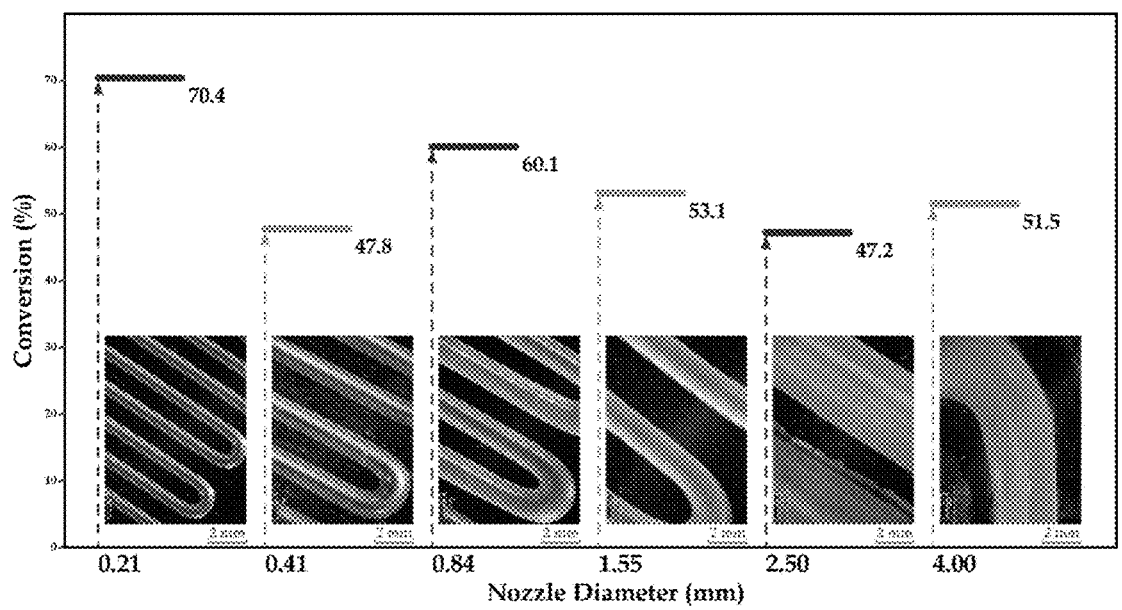
FIG. 2 is an ultra-widefield microscope image of the conversion rate and morphology of samples obtained by using different diameters.

Raw material 1.0 wt. % initiator (Irgacure 784), 1.0 wt. % NaYF4 up-conversion nanoparticles, 13.0 wt. % thixotropic agent (Aerosil, Evonik TS100), 42.5 wt. % epoxy acrylate resin and 42.5 wt. % monomer. After weighing the trimethylolpropane acrylate (TMPTA), it is fully mixed in the mixed defoamer to obtain the ink (the elastic modulus G' is 0.53 kPa, and the loss modulus G" is 0.28 kPa). Fill the ink into the ink storage tank, control the extrusion pressure to 50 kPA, the ink is extruded through the direct writing nozzle (0.21, 0.41, 0.80, 1.55, 2.50, 4.00 mm), and the direct writing nozzle is made in the horizontal plane through the controller. In reciprocating motion, the laser emitting structure and the direct writing nozzle are relatively static, and the beam is located 2 mm directly below the direct writing nozzle. The laser emitting structure emits a light beam with a wavelength of 980 nm, the laser power is 3.5 W, and the printing speed is controlled at 1.0 mm/s. Lines with different line widths can be obtained, as shown in FIG. 2. The characteristic absorption peak changes are measured by total reflection Fourier transform infrared spectroscopy. No matter the line diameter is widened (0.41-4.00 mm), the conversion rate does not fluctuate significantly, at about 50%, which proves that the near-infrared penetration can achieve uniform curing.

Example 2

Figure 3:
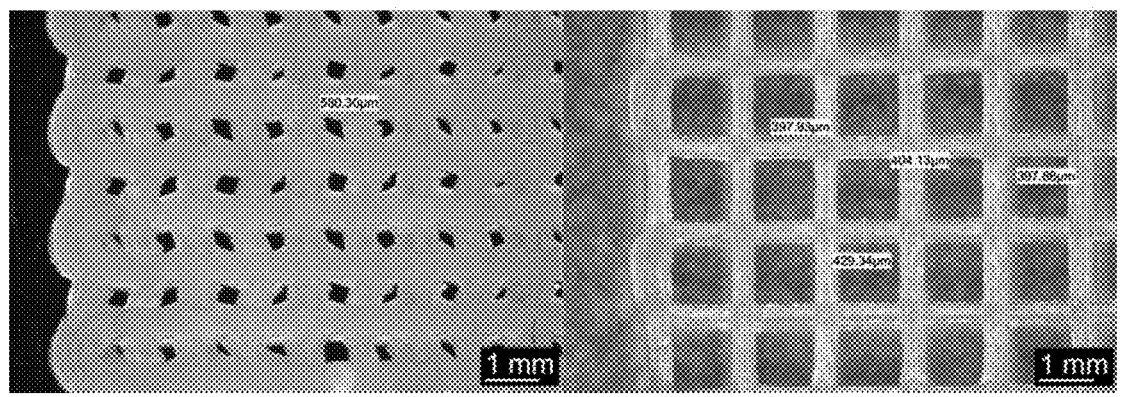
FIG. 3 is a contrast image of a sample obtained without near-infrared real-time curing and a sample obtained with near-infrared real-time curing

Real-time curing using near-infrared light using the same process parameters, direct writing printing equipment and working parameters of the ink in Example 1, only 0.41 mm nozzles are used for grid printing (first control the direct writing nozzles to reciprocate in the horizontal plane, and then control the direct writing nozzle lifted and changes the original direction of movement to continue reciprocating motion) to obtain a 3D printed object as shown in the right of FIG. 3.

For curing using near-infrared light after printing: using the same ink process parameters, direct writing printing equipment and working parameters mentioned above, using 0.41 mm nozzles for grid printing, the ink moves with the direct writing nozzles and is extruded to obtain the shape, After the extrusion is finished, the near-infrared light is used for curing to obtain a 3D printed object as shown in the left of FIG. 3.

A comparison is made between using near-infrared light to cure after printing and using near-infrared light to cure in real time, as shown in FIG. 2. The lines of the post-cured sample collapsed, while the lines of the real-time cured sample remained better and the structure was regular.

Example 3

Figure 4:
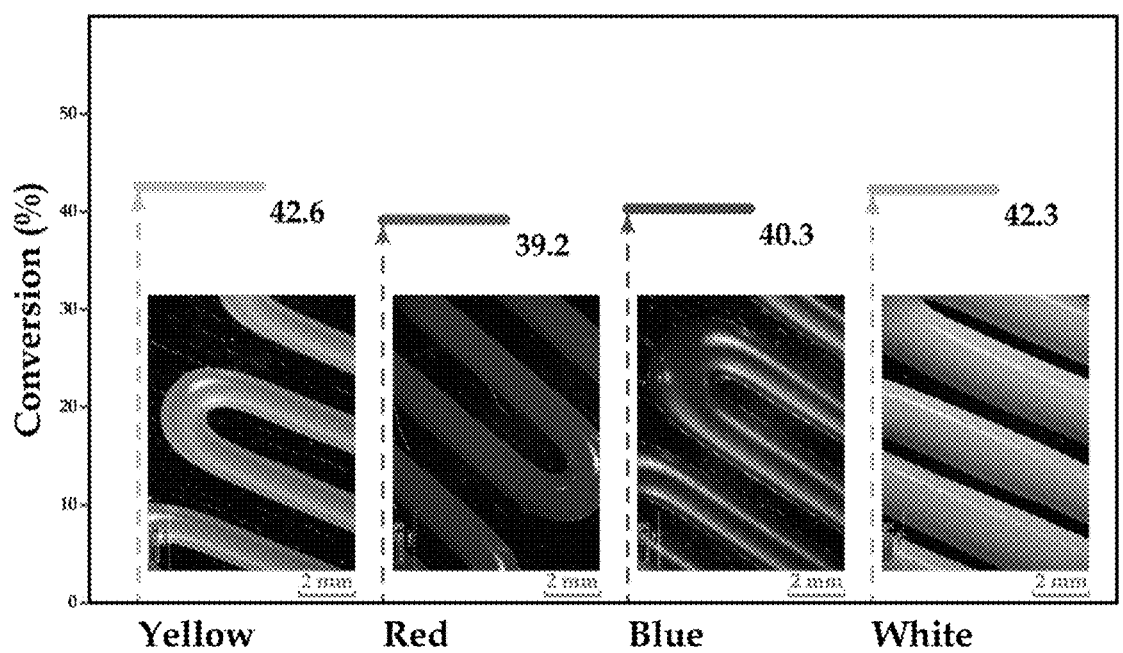
FIG. 4 is a microscope image of the conversion rate and morphology of the sample printed with inks mixed with different pigments
Figure 5:
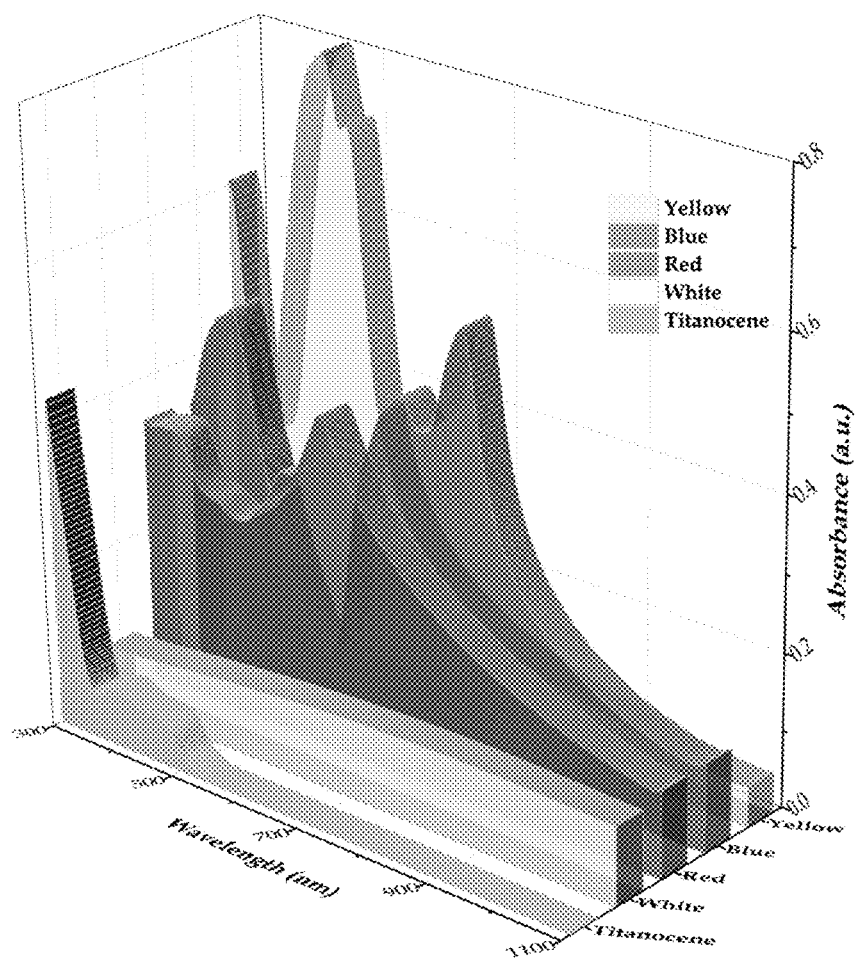
FIG. 5 is the ultraviolet-visible light absorption spectra of the initiator Iragacure 784 and four pigments used in the examples FIG. 6 *a* and *b* are respectively a sample diagram and a cross-sectional view of a sample with different colors inside and outside obtained by using two color inks for coaxial printing in Example 4.

The working setup of the near-infrared photopolymerized ink direct-write 3D printing equipment is the same as in Example 1. The 1.0% wt initiator (Irgacure 784), 1.0 wt % NaYF4:Yb, Tm up-conversion nanoparticles, 0.5 wt. % colorant (red, Yellow, blue, white), 12.5 wt. % thixotropic agent (aerosol, Evonik TS100), 42.5 wt % epoxy acrylate resin and 42.5 wt. % monomer trimethylolpropane acrylate (TMPTA) after weighing In the mixed defoaming machine, the ink is obtained by fully mixing (the elastic modulus G' is 0.49 kPa, and the loss modulus G" is 0.25 kPa). Fill the ink into the printer, control the extrusion pressure to 50 kPA, use a 1.55 mm direct writing nozzle, the laser power is 3.5 W, and the printing speed is controlled to 1.0 mm/s. Lines of different colors can be obtained, and the result is shown in FIG. 4. As shown in FIG. 5, according to the ultraviolet-visible light absorption spectrum, the absorption band (300-500 nm) of the initiator used overlaps with the absorption peak of the color paste, and there is a competitive relationship in the process of absorbing and using the energy of the light source. If ultraviolet-blue light is used Printing curing is difficult to achieve curing. The characteristic absorption peak changes of samples after NIR curing were measured by total reflection Fourier transform infrared spectroscopy. The phase conversion rate of different colors did not fluctuate significantly, at about 40%, which proved that the color samples can be cured by using near-infrared penetration.

Example 4

Figure 6:
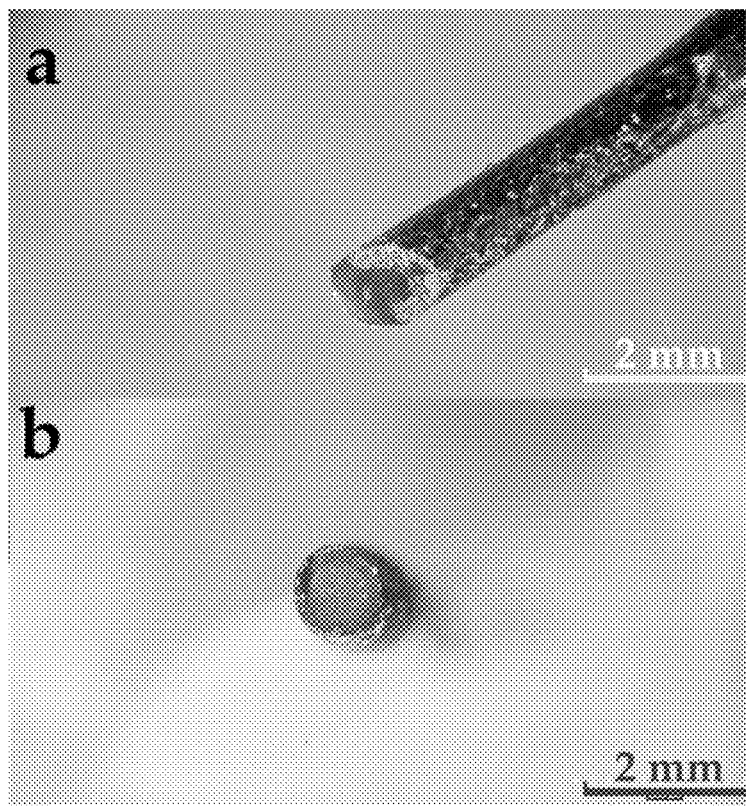
Figure 7:
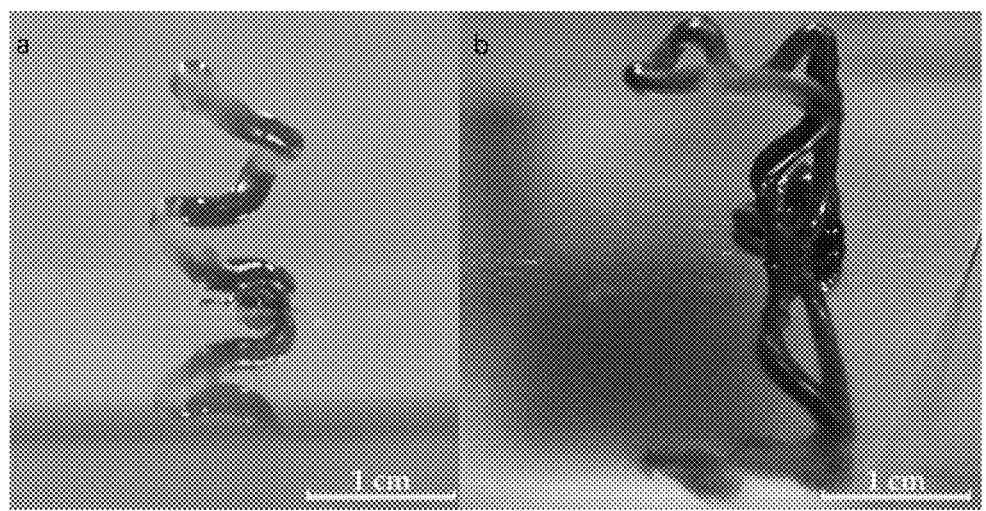
FIG. 7 *a* and *b* are two different 3D printed bodies with suspended structures obtained in Example 5 respectively.

Use coaxial nozzles (outside 1.3 mm, inside 0.5 mm) for simultaneous dual-color extrusion of the color paste in Example 3 under the same process: use coaxial nozzles (outside 1.3 mm, inside 0.5 mm) as direct writing nozzles, At the same time, the two-color inks are filled and connected to the inner and outer flow channels of the coaxial nozzle, and they are extruded under the force and are irradiated by the near-infrared to realize curing to obtain lines with two colors inside and outside. It is proved that it is possible to realize multi-color/multi-material by using near-infrared penetration, and the result is shown in FIG. 6.

Example 5

Under the printing parameters in Example 3, by simultaneously raising the direct writing nozzle and the near-infrared light spot, the ink is gradually extruded from the substrate into the suspended air and solidified, so that 3D printing of a self-supporting suspended structure can be realized. Compared with traditional 3D printing methods, such as thermally cured ink direct writing, techniques such as stereo lithography need to add additional support to the suspended structure and cut after printing. The method utilizes the penetrability and controllability of near-infrared curing to promote the ink to reach the gel point quickly and uniformly to realize the self-supporting ability.

What is claimed is:

1. A direct ink writing three-dimensional printing method based on near-infrared photopolymerization, wherein the method is as follows: the direct writing nozzle moves or stands still in a three-dimensional space, and the ink is extruded out of the direct writing nozzle, under the irradiation of near-infrared light, the 3D printed object is solidified after photocuring, and the curing time t does not exceed a ratio of the near-infrared light diameter ($d_l$) to an ink extrusion speed ($v_i$), that is, $t \leq d_l/v_i$;

the rheological properties of the ink should satisfy: the elastic modulus G' is 0.5-5 times the loss modulus G", that is, $0.5G'' \leq G' \leq 5G'$;

the composition of the ink is as follows:
0-80 wt. % photopolymerizable resin, 0-80 wt. % photopolymerizable monomer, 0.5-6 wt. % photoinitiator, 0.5-5 wt. % upconversion material, 0-30 wt. % thixotropic agent, and 2-30 wt. % fillers; and
the moving speed of the direct writing nozzle is 0 to 5.0 mm/s.

2. The method according to claim 1, wherein the diameter of the direct writing nozzle is in the range of 0.1 μm to 10 cm.

3. The method according to claim 1, wherein the force for ink-extruding is pressure, and the pressure does not exceed 800 kPa.

4. The method according to claim 1, wherein the near-infrared laser is a light beam or light spot, and the light spot or light beam is located within 1 cm of the direct writing nozzle.

5. The method according to claim 1, wherein the power of the near-infrared laser is 0-50 W, and the wavelength range is 700-2000 nm.

6. The method according to claim 1, wherein the photopolymerizable resin includes a resin containing an acrylate double bond, a resin containing a vinyl ether double bond, and a resin containing an epoxy group;

the photopolymerizable monomer includes one or more of the following monomers: monofunctional acrylate monomers, difunctional acrylate monomers, multifunctional acrylate monomers, vinyl ether monomers, ester ring epoxy monomers, oxetane monomers;

photoinitiator includes one or more of following initiators: 2,4,6-trimethyl benzoyl diphenyl phosphine oxide; 1-hydroxycyclohexyl phenyl ketone; 2,4,6-trimethyl benzoyl phenyl phosphonic acid ethyl ester; bis 2,6-difluoro-3-pyrrole phenyl titanocene; phenyl bis (2,4,6-trimethylbenzoyl) phosphine oxide; 2-isopropylthioxanthone; 2-Hydroxy-2-methyl-1-phenylacetone; 2-methyl-2-(4-morpholinylphenyl)-1-[4-(methylthio) phenyl]-1-acetone,1,7,7'-Trimethyl-bicyclo(2,2,1)heptane-1,3-dione; tetrafluoroborate methyl diphenyl sulfonium salt; 4,4'-dimethyl diphenyl iodonium salt hexafluorophosphate; ferrocene hexafluorophosphate;

the up-conversion material includes one or more of $NaYF_4$, $BaYF_5$, $NaGdF_4$, $LiYF_4$, $NaYbF_4$, $Na_3ScF_6$, $YF_3$, and GdOF;

thixotropic agents include fumed silica; and the filler includes one or more of barium sulfate, titanium dioxide, silicon dioxide, and talc.

7. The method according to claim 1, wherein the ink contains pigments.

* * * * *